Oct. 10, 1939. J. C. CROWLEY Re. 21,230
VULCANIZING UNIT
Original Filed Jan. 16, 1936
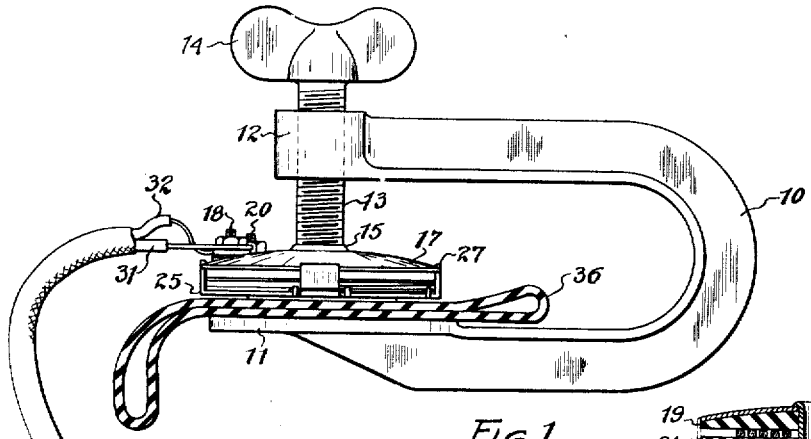
FIG. 1
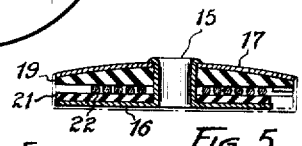
FIG. 5
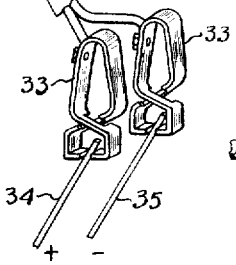
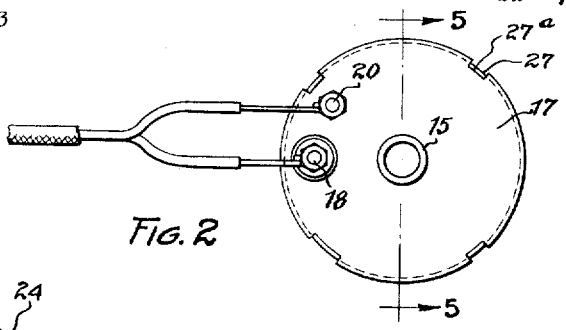
FIG. 2
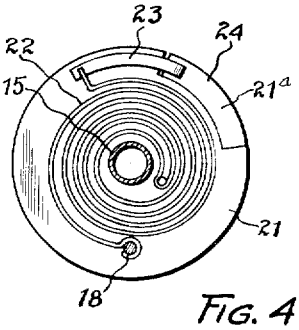
FIG. 4
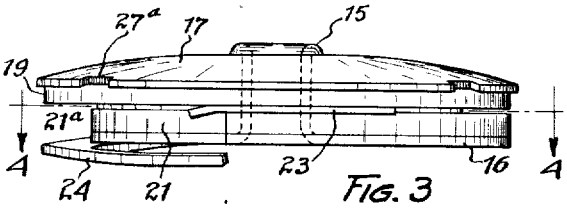
FIG. 3
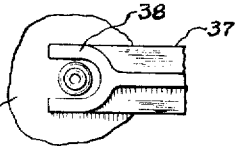
FIG. 8
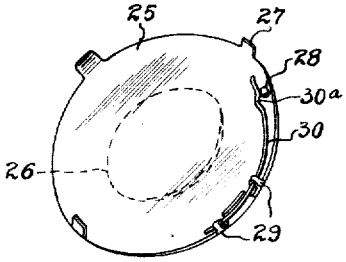
FIG. 6
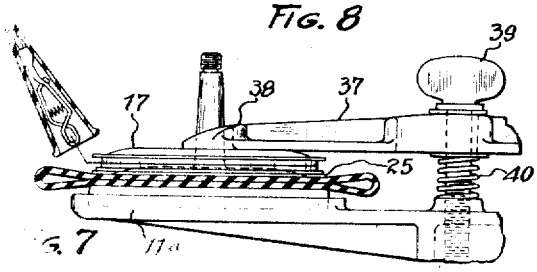
G. 7
INVENTOR.
JOHN C. CROWLEY
BY Lewis Hudson & Kent
ATTORNEYS.

Reissued Oct. 10, 1939

Re. 21,230

UNITED STATES PATENT OFFICE 21,230

VULCANIZING UNIT

John C. Crowley, Cleveland Heights, Ohio, assignor to The Dill Manufacturing Company, Cleveland, Ohio, a corporation of Ohio Original No. 2,075,705, dated March 30, 1937, Serial No. 59,438, January 16, 1936. Application for reissue February 18, 1938, Serial No. 191,276

14 Claims. (Cl. 18—18)

This invention relates to an electrical vulcanizer, and particularly to an electrical vulcanizer for vulcanizing patches upon rubber articles, such as tire tubes, rubber balls, bags and the like.

An object of the invention is to provide an electrical vulcanizer which can be manufactured and sold at a relatively low cost and which can be economically used by the purchaser.

Another object is to provide an electrical vulcanizer comprising a part or member which contains the heating element and which can be used repeatedly together with a part or member carrying the vulcanizing patch and which is very simple and inexpensive and can be thrown away after use, wherefore the first named part or member of the vulcanizer, together with a number of the second named parts or members thereof can be packaged and sold to the purchasing public.

Another object is to provide in a vulcanizing unit formed of a pair of normally and readily separable members, one of which carries an electrical heating element and the other the vulcanizing patch and which members in use are adapted to have the first named member superimposed upon the other member, cooperating means on said members for locating the same in a predetermined relative position with respect to each other when superimposed as aforesaid.

A further object is to provide an electrical vulcanizer wherein there is embodied improved means for preventing the heat of vulcanization exceeding a predetermined temperature and, therefore, eliminating all danger of injuring the article to which the patch is being vulcanized.

Another object is to provide an electrical vulcanizer which is simple in construction, relatively inexpensive to manufacture and which can be easily used for vulcanizing rubber patches upon rubber articles.

Further and additional objects and advantages not referred to above will become apparent hereinafter during the following detailed description of two embodiments of the invention.

Referring to the accompanying drawing,

Fig. 1 is a side elevational view of the electrical vulcanizer embodying the present invention, the rubber article to which the patch is being vulcanized being shown in section.

Fig. 2 is a top plan view of one of the parts or members of the electrical vulcanizer.

Fig. 3 is a side elevational view on an enlarged scale of the part or member shown in Fig. 2.

Fig. 4 is a horizontal sectional view on a reduced scale and is taken substantially on line 4—4 of Fig. 3 looking in the direction of the arrows.

Fig. 5 is a vertical sectional view taken substantially on line 5—5 of Fig. 2 looking in the direction of the arrows.

Fig. 6 is a detailed perspective view of another part or member of the vulcanizer, namely, the pad carrying the vulcanizing patch.

Fig. 7 is a fragmentary side elevational view of a modified form of the invention from that previously illustrated, and Fig. 8 is a fragmentary top plan view of the device shown in Fig. 7.

The electrical vulcanizer of the present invention may be used with any suitable clamping means since it is not constructed so as to be operatively or permanently secured to any particular clamping means but, on the contrary, is intended to be readily removable from such means when not in use.

A suitable clamping means with which the vulcanizer may be used is illustrated in the drawing and comprises a C-shaped member 10, one arm of which is provided with an enlarged flat article-supporting plate or table 11, while the other arm of the member 10 is provided at its end and above the plate 11 with a boss 12 having a threaded bore therein carrying a clamping bolt 13 that is provided at its upper end with an operating handle 14. The lower end of the clamping bolt 13 may be provided with a reduced portion to detachably engage in a hollow rivet 15 formed integral with a sheet metal plate or disk 16 and extending centrally from such disk through a second sheet metal plate or disk 17.

The plates or disks 16 and 17 with the parts arranged therebetween and later to be described constitute one member or part of the vulcanizing unit and, as will later appear, this member or part of the unit in use is superimposed upon the other member or part of the unit, although when the unit is not being used the two members or parts are readily and normally separable with respect to each other.

The plate or disk 17 carries a binding post 18 which is electrically insulated therefrom and extends therethrough and through an insulating disk 19 of asbestos or other suitable material located below the plate or disk 17 as clearly shown in Fig. 3. The plate or disk 17 is also provided with a second binding post 20 which is electrically connected therewith. A disk 21 of insulating material, such as asbestos, is located above the plate or disk 16, while between the insulating disks 19 and 21 there is arranged a coiled electrical resistance or heating element 22, one end of which is connected to the insulated post 18, as clearly shown in Fig. 4, while the opposite end of the element is suitably connected to an arcuate contact finger 23 which has its end extending over a recess 21*a* cut in the circumference of the insulating disk 21. The plate 16 is arcuately slitted inwardly of its circumference to provide a spring contact finger 24, the free end of which, as shown in Fig. 4, extends below the recess 21*a* of the disk 21 and the free end of the finger 23.

It will be seen that when the contact finger 24 is pressed upwardly its end will be free to engage the end of the contact finger 23, at which time there is a complete electrical circuit through the electrical heating element carried by this part or member of the vulcanizing unit, which circuit includes the insulated binding post 18, the electrical resistance element 22, contact fingers 23 and 24, plate 16, rivet 15, plate 17 and the binding post 20 that is electrically connected with the plate 17. In other words, the electrical heating element during use of the device will have one of its ends insulated from the member or part of the vulcanizer which carries it, while its opposite end will be electrically connected therewith.

The other part or member of the vulcanizing unit and which is normally and readily separable from the previously described part or member of the unit comprises a sheet metal disk 25 which carries on its underside the patch 26 which is to be vulcanized to the article, see Fig. 6. As previously stated, when the vulcanizing unit is in use the part formed of the plates 16 and 17 and the elements associated therewith is superimposed upon the other part and in order that the two superimposed members or parts can be located in a predetermined relative position with respect to each other they are provided with cooperating means which will now be described. The disk 25 is provided on its circumference with a plurality of upstanding lugs or portions 27, and preferably one or more of such lugs or portions is of a different size than the remainder of the lugs or portions. The plate 17 of the other member of the unit is provided on its periphery with a plurality of recesses 27*a* complementary in number and size to the lugs or upstanding portions 27 on the disk 25. It will be seen that when the upper member or part is superimposed upon the other member or part and nested within the upstanding lugs or portions thereof the two parts will have to be in a predetermined relative position with respect to each other to enable the different lugs or portions 27 of the disk 25 to fit into the complementary recesses 27*a* in the other member of the unit. The reason that the two members of the unit must be located accurately with respect to each other when arranged in superimposed relationship will now be explained.

The disk 25 is provided with a post or rivet 28 formed of fusible solder or other fusibe material. The disk 25 is provided on opposite sides of one of the lugs 27 with integral hooked arms 29 in which is secured a wire spring 30 having adjacent its free end an upwardly extending hump 30*a* and said free end of the spring is engaged behind the post or rivet 28. The hump 30*a* of the spring when the parts or members are assembled or superimposed upon each other and pressed together engages the free end of the contact finger 24 and overcomes the resilience of the same and presses it against the contact finger 23 so that a complete electrical circuit through the first described part or member of the vulcanizing unit may be established, as previously referred to. The binding posts 18 and 20 are connected to suitable conductors 31 and 32, which, in turn, may be connected by means of clamps 33 or other suitable means to the post terminals of a battery as represented by the conductors 34 and 35 in Fig. 1, if the vulcanizer is being used where there is no commercial current available as, for example, in vulcanizing patches upon tire tubes while on the road, or the conductors 31 and 32 can be connected to a suitable transformer if commercial current is being employed.

The article 36 to which the patch 26 is to be vulcanized is positioned upon the table 11 of the member 10 and then the vulcanizing unit comprising the parts or members previously described is arranged with the member carrying the heating element superimposed upon the member carrying the vulcanizing patch and the unit is then positioned upon the article with the patch in the proper location thereon. The clamping screw 13 is now turned down to press the two parts or members of the vulcanizer together and to cause the patch to engage the article under pressure, it being understood that the free end of the screw 13 preferably engages the rivet 15 of the upper member of the vulcanizing unit. At this time the hump 30*a* of the spring 30 has forced the end of the spring contact finger 24 which is integral with the plate 16 into engagement with the contact finger 23, wherefore when the vulcanizer is connected to a source of electrical energy a complete circuit for the current is established through the insulated binding post 18, resistance element 22, contact fingers 23, 24, the plates or disks 16 and 17 and the binding post 20 that is electrically connected with the plates or disks. The resistance element consequently heats up and raises the temperature of the plate 16 and disk 25 to a degree such that the patch 26 is vulcanized to the article 36.

It is desirable that excessive heat be avoided because of its deleterious effect upon the article and such excessive heat is adequately guarded against in the vulcanizer as will now be explained.

If during the vulcanizing operation the heat of the plate should exceed a predetermined degree the post or rivet 28 which, as has been stated, is constructed of fusible material, will fuse and then the spring rod or wire 30 is free to spring outwardly and the hump 30*a* is moved out of engagement with the end of the contact finger 24. When this has taken place the contact finger, due to its inherent resilience, moves toward the position shown in Fig. 3 and out of contact with the end of the contact finger 23, thus breaking the circuit through the resistance element.

It will be seen that the part or member of the vulcanizer formed by the disk 25 and constituting the vulcanizing pad which carries the vulcanizing patch can be very economically manufactured, inasmuch as it is simply a sheet metal disk stamping having the fusible post 28 and wire 30 and contains no expensive part, such as a resistance element or other parts. In view of this fact after each use of the vulcanizer the vulcanizing pad or disk 25 may be thrown away and when the vulcanizer is again used a new disk or pad 25 may be employed. This arrangement possesses decided advantages in the manufacture and sale of a vulcanizer of this type, inasmuch as the device or vulcanizing unit can be packaged and distributed by including in the package the resistance element carrying member of the vulcanizer and a number of the other members or vulcanizing pads or disks 25, thus providing for a vulcanizer which is relatively inexpensive for the purposes for which it is used and which is provided with destructible means for interrupting the circuit through the resistance element when a predetermined temperature has been reached.

In the modified form shown in Figs. 7 and 8 the part or member of the unit that carries the electrical heating element corresponds substantially to the like part in the form previously described and includes the plates 16 and 17 together with the elements associated therewith, except, as will later be pointed out, while the other member of the vulcanizing unit, namely, the vulcanizing pad, corresponds substantially to the pad or disk 25 previously described. In this modified form of vulcanizing unit the electrical heating element 22*a* is substantially the same as the heating element 22, in that it has one of its ends electrically connected to the member which carries it and its other end electrically insulated therefrom.

It will be noted, however, that the plate 17 in the modified form is not provided with a binding post corresponding to the insulated post 18, but instead the insulated end of the heating element 22*a* is extended beyond the periphery of the member carrying the element, as indicated at 22*b* in Fig. 7. When this modified form of vulcanizing unit is employed the heating element 22*a* may be connected to a source of electrical energy by means of a well known form of clip 41 connected to one side of the electrical circuit and by means of a similar clip connected to the other side of the circuit and which may be engaged with the arm of the clamp that is in engagement with the plate 17 of the upper member or with any other suitable part that is electrically connected with the plate 17, it being remembered that the heating element 22*a* has one of its ends electrically connected with said plate while its opposite end is insulated therefrom.

The two parts or members of this modified form are each provided with central openings which when the parts or members are assembled or superimposed are in alignment and are of such size that a valve stem may extend therethrough.

This device, therefore, can be used to vulcanize the rubber bases of valve stems, such as rubber stems or stems having rubber or cord fabric bases to the inner tubes of tires. Pressure is applied to the parts of the device in any desired manner as, for example, by means of an arm 37 having at its outer end a forked portion 38 which straddles the valve stem and bears upon the plate 17 of the upper part or member of the unit. An adjusting or clamping member 39 extends through the arm and through a spring 40 arranged thereon and engaging the underside of the arm, and turning movement of this member will cause the arm to move downwardly into clamping or holding engagement with the plate 17 as is readily apparent in Fig. 7.

Although preferred embodiments of the invention have been illustrated herein, it should be understood that the invention is susceptible of various modifications and adaptations within the scope of the appended claims.

Having thus described my invention I claim:

1. A vulcanizing device adapted to be used with but readily separable from a suitable clamping means comprising a pair of cooperating superimposed separable members, one of which is adapted to have pressure applied thereto by the clamping means and the other of which is provided with a vulcanizing patch for engagement with a rubber article, an electrical resistance element carried by said first named member which when energized creates the heat of vulcanization, and cooperating means carried by said members and coacting automatically when said members are arranged in the clamping means in superimposed relationship and pressure is applied to the first named member by said clamping means to enable an electrical circuit to be completed through said resistance element.

2. A vulcanizing device comprising a pair of cooperating superimposed members, one of said members being adapted to have pressure applied thereto by a suitable clamping means and provided with an electrical resistance element adapted to be energized to create the heat of vulcanization, the other of said members being separable from said first named member and said clamping means and adapted to carry a vulcanizing patch for engagement with a rubber article, and fusible means carried by said last named member for controlling the electrical circuit through the resistance element carried by the first named member and which fuses at a predetermined temperature whereby said last named member is destroyed by use and may be discarded following the vulcanization process.

3. A vulcanizing device adapted to be used with but readily separable from a suitable clamping means and comprising a pair of cooperating superimposed separable members, one of which is adapted to have pressure applied thereto by the clamping means and the other of which is provided with a vulcanizing patch for engagement with a rubber article, a resistance element carried by said first named member which when energized creates the heat of vulcanization, and cooperating means carried by said members and coacting automatically when said members are arranged in the clamping means in superimposed relationship and pressure is applied to the first named member by said clamping means to enable an electrical circuit to be completed through said resistance element, the means which is carried by the second named member being fusible at a predetermined temperature whereby the circuit through the resistance element carried by the first named member will be automatically broken when said second named member and said means reaches said predetermined temperature.

4. A vulcanizing device comprising a pair of cooperating superimposed members, one of said members being adapted to have pressure applied thereto by a suitable clamping means and being provided with an electrical resistance element, said member also being provided with normally separated contact fingers arranged in the circuit through said resistance element and adapted to be brought into engagement to complete said circuit, the other of said members being separable from said first named member and said clamping means and adapted to carry a vulcanizing patch in engagement with a rubber article, and means carried by said second named member and acting when said members are arranged in superimposed relationship and pressure applied thereto to move into engagement said normally separated contact fingers carried by the first named member.

5. A vulcanizing device comprising a pair of cooperating superimposed members, one of said members being adapted to have pressure applied thereto by a suitable clamping means and being provided with an electrical resistance element, said member also being provided with normally separated contact fingers arranged in the circuit through said resistance element and adapted to be brought into engagement to complete said circuit, the other of said members being separable from said first named member and said clamping means and adapted to carry a vulcanizing patch in engagement with a rubber article, and means carried by said second named member and acting when said members are arranged in superimposed relationship and pressure applied thereto to move into engagement said normally separated contact fingers carried by the first named member, said means including a post which fuses at a predetermined temperature whereby the circuit through the resistance element is broken and said second named member is destroyed by use and may be discarded following the vulcanization process.

6. A vulcanizing unit comprising a pair of normally and readily separable members one of which is provided with an electrical heating element and the other with a vulcanizing patch and is intended to be discarded after use, said unit being adapted to be used with but normally separate from and independent of a suitable clamping means, said members in use being arranged with said first named member superimposed upon said second member and clamping pressure applied thereto, said members having cooperating means for locating the same in a predetermined relative position with respect to each other when superimposed as aforesaid.

7. A vulcanizing unit comprising a pair of normally and readily separable members one of which is provided with an electrical heating element and the other with a vulcanizing patch and is intended to be discarded after use, said unit being adapted to be used with but normally separate from and independent of a suitable clamping means, said members in use being arranged with said first named member superimposed upon said second named member and clamping pressure applied thereto, one of said members having a recess formed therein and the other of said members being provided with a projecting element cooperating with said recess to locate said members in a predetermined relative position with respect to each other when supermposed as aforesaid.

8. A vulcanizing unit comprising a pair of normally and readily separable members, one of said members being provided with a vulcanizing patch and intended to be discarded after use and the other of said members comprising a pair of spaced metal disks having arranged therebetween suitable insulating material and an electrical heating element, said members in use being arranged with said second named member superimposed upon said first named member and clamping pressure applied thereto, said members having cooperating means for locating the same in a predetermined relative position with respect to each other when superimposed as aforesaid.

9. A vulcanizing unit adapted to be used with but separable from a suitable clamping means and comprising a pair of normally and readily separable members one of said members being in the form of a sheet metal stamping and provided on one side with a vulcanizing patch adapted to be positioned upon the article to be vulcanized, the other of said members being adapted in use to be positioned upon the first named member and to have pressure applied thereto by the clamping means and comprising a pair of sheet metal disks provided with registering centrally disposed openings, a pair of insulating disks arranged between said sheet metal disks, an electrical heating element mounted between said insulating disks, and means extending through said registering centrally disposed openings and securing said sheet metal disks, said insulating disks and said heating element in assembled relationship.

10. A vulcanizing unit adapted to be used with but separable from a suitable clamping means and comprising a pair of normally and readily separable members one of said members being in the form of a sheet metal stamping and provided on one side with a vulcanizing patch adapted to be positioned upon the article to be vulcanized, the other of said members being adapted in use to be positioned upon the first named member and to have pressure applied thereto by the clamping means and comprising a pair of sheet metal disks provided with registering centrally disposed openings, a pair of insulating disks arranged between said sheet metal disks, an electrical heating element mounted between said insulating disks, and means extending through said registering centrally disposed openings and securing said sheet metal disks, said insulating disks and said heating element in assembled relationship, said members having cooperating means for locating the same in a predetermined relative position with respect to each other when said second member is positioned upon said first member as aforesaid.

11. An electrical vulcanizer adapted to be used with but normally separate from and independent of a suitable clamping means and comprising two normally and readily separable members which in use are adapted to be arranged in superimposed position and to have pressure applied thereto by said clamping means, one of said members carrying a vulcanizing patch and intended to be discarded after use and the other of said members being provided with an electrical heating element which has one of its ends insulated from said member and its other end electrically connected with said member.

12. An electrical vulcanizing unit comprising a pair of normally and readily separable members, one of said members being in the form of a sheet metal stamping provided at its periphery with upstanding portions, said member being provided on one side with a vulcanizing patch, the other of said members being formed of sheet metal disks having therebetween suitable insulating means and an electrical heating element, said last named member in use being superimposed upon the first named member and nested within the upstanding peripheral portions thereof, said second named member being provided with means cooperating with the upstanding portions of the first named member to locate said members in a predetermined relative position with respect to each other when superimposed and nested as aforesaid.

13. An electrical vulcanizing unit comprising two normally and readily separable members, one of which is provided with an electrical heating element and in use is adapted to be superimposed upon the other of said members and clamping pressure applied thereto, said other member being in the form of a sheet metal disk having upstanding portions on its periphery in which said first named member is nested when superimposed as aforesaid and provided on its outer side with a vulcanizing patch.

14. An article of manufacture comprising a member in the form of a sheet metal stamping provided on one side with a vulcanizing patch and adapted in use to be positioned temporarily against a member having an electrical heating element, said patch carrying member having fusible means thereon on the side thereof opposite to said vulcanizing patch adapted to cooperate with said member having an electrical heating element and to control the circuit through said element and being provided with means for properly positioning it with respect to said last named member, said fusible means being formed of material which fuses at a substantially lower temperature than the fusing temperature of said member.

JOHN C. CROWLEY.

Disclaimer

Re. 21,230.—*John C. Crowley*, Cleveland Heights, Ohio. VULCANIZING UNIT. Patent dated Oct. 10, 1939. Disclaimer filed Mar. 28, 1950, by the assignee, *The Dill Manufacturing Company.*

Hereby enters this disclaimer to claims 6 to 13, inclusive, of said patent.

[*Official Gazette April 25, 1950.*]